Jan. 9, 1945.  E. C. STYBERG  2,367,069
GRINDER
Filed June 17, 1943  5 Sheets-Sheet 1

Inventor
Ernest C. Styberg

Jan. 9, 1945. E. C. STYBERG 2,367,069
GRINDER
Filed June 17, 1943 5 Sheets-Sheet 3

Inventor
Ernest C. Styberg
By [signature]
Attorney

Jan. 9, 1945. E. C. STYBERG 2,367,069
GRINDER
Filed June 17, 1943 5 Sheets-Sheet 4
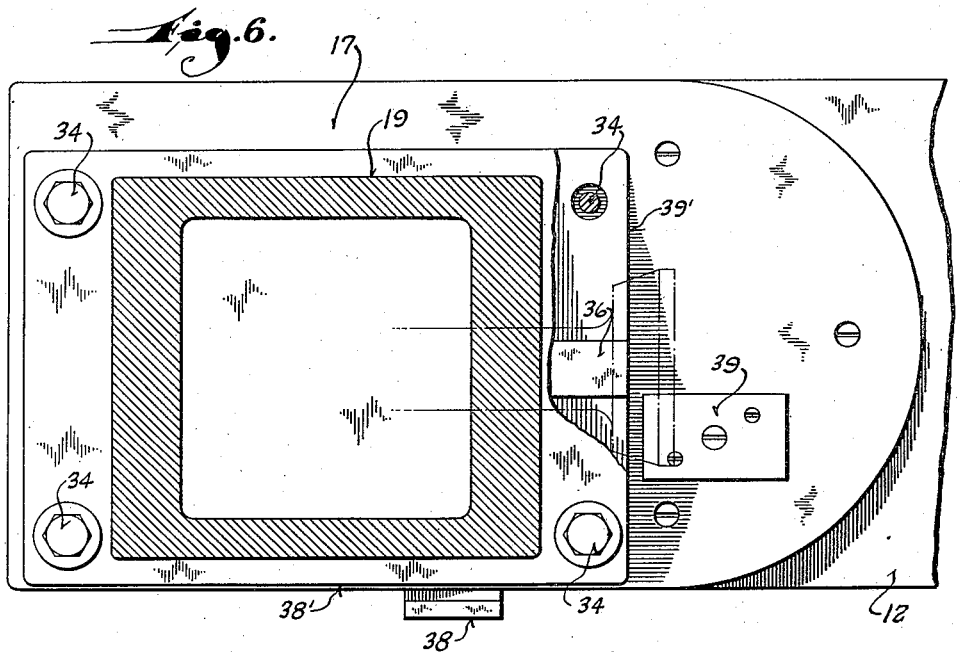
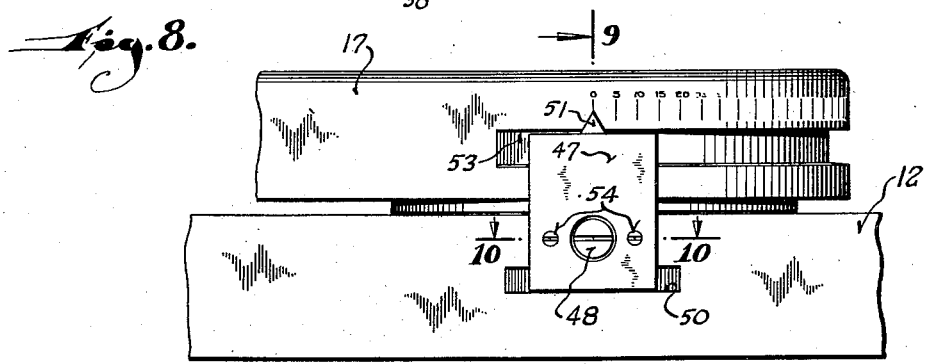
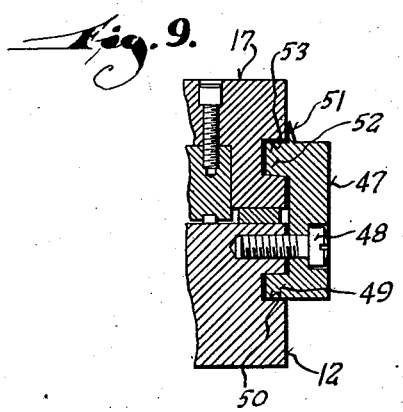
Inventor
Ernest C. Styberg
By
Attorney Jan. 9, 1945.  E. C. STYBERG  2,367,069
GRINDER
Filed June 17, 1943  5 Sheets-Sheet 5
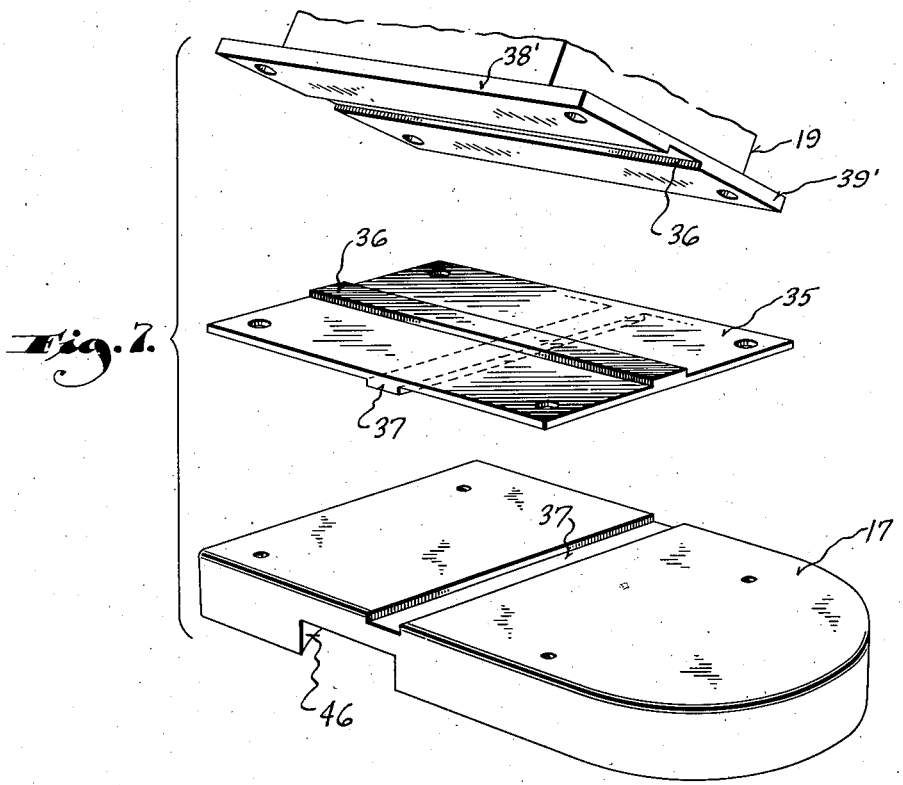
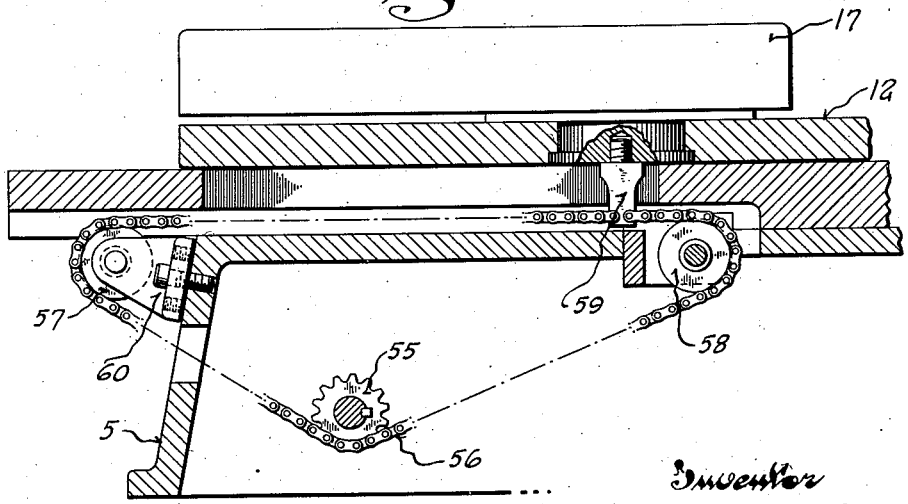
Inventor
Ernest C. Styberg Patented Jan. 9, 1945

2,367,069

UNITED STATES PATENT OFFICE 2,367,069

GRINDER

Ernest C. Styberg, Racine, Wis., assignor to E. C. Styberg Engineering Co., Racine, Wis., a corporation of Wisconsin Application June 17, 1943, Serial No. 491,091

5 Claims. (Cl. 51—105)

This invention relates to machine tools and refers particularly to grinders especially adapted for internal grinding.

It is an object of this invention to provide a machine of the character described by which taper grinding of any predetermined angle, as well as straight bore grinding, may be performed in one chucking thus eliminating all possibility of misalignment between bores.

Another object of this invention is to provide a machine so constructed that during the grinding operation the angle of the grinding being done may be quickly and easily changed.

With a view toward high-speed production, it is another object of this invention to provide a grinder wherein the work is supported on a turret to swing about an axis passing through that point of the work where the angle of the grinding is to change and wherein means are provided for quickly indexing the turret from one position to the other to quickly and accurately change the angle of the grinding.

Another object of this invention is to provide means whereby the work holding assembly may be accurately located on the turret to insure the point of the work about which the angle changes being centered on the turret axis.

Another object of this invention resides in the provision of a machine of the character described wherein the work holding assembly is mounted on a turret angularly adjustable about the axis of its mounting and wherein an indicator provided to facilitate angular adjustment also serves to lock the turret in an adjusted position.

Still another object of this invention is to provide improved means for reciprocating the table of the machine by which the work is brought into and out of engagement with the tool.

A further object of this invention is to provide means for releasably latching the turret on which the work holding assembly is mounted in any one of predetermined fixed positions.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best mode so far devised for the practical application of the principles thereof, and in which:

Figure 6 is a horizontal cross sectional view taken through Figure 2 on the plane of the line 6—6;

Figure 7 is a perspective view illustrating the base of the chuck housing, the turret and the slide plate interposed therebetween to facilitate adjustment of the chuck housing on the turret;

Figure 8 is a fragmentary side view of a part of the chuck and the reciprocating table upon which it is mounted, illustrating the use of an indicator for the purpose of locking the turret in an adjusted position;

Figure 9 is a detail cross sectional view taken through Figure 8 on the plane of the line 9—9;

Figure 10 is a detail cross sectional view taken through Figure 8 on the plane of the line 10—10; and Figure 11 is a view illustrating a modified form of table drive for reciprocating the table.

Figure 1:
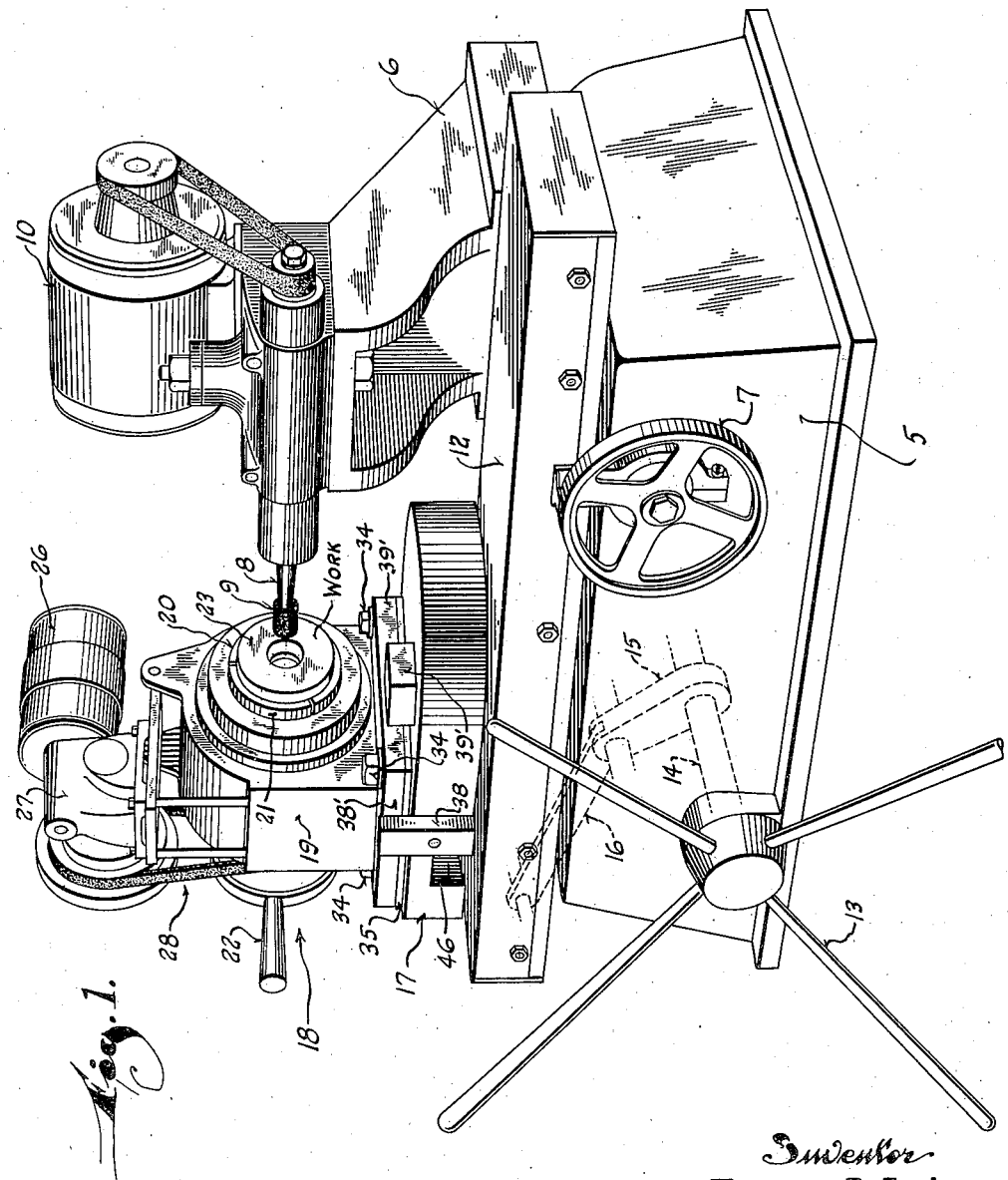
Figure 1 is a perspective view of a grinder embodying this invention.

Referring now particularly to the accompanying drawings, in which like numerals indicate like parts, the numeral 5 designates the base of the machine which may be mounted on a bench or other suitable support (not shown) and on which a spindle bracket 6 is transversely adjustably mounted. The specific mounting of the bracket 6 is of conventional design and thus not illustrated.

A hand wheel 7 secured to a lead screw (not shown) enables adjustment of the bracket 6 transversely of the base.

The bracket 6 mounts a spindle 8, one end of which carries a grinder wheel 9. The opposite end of the spindle is drivingly connected with a motor 10.

In front of the bracket 6 the base 5 supports a reciprocating table 12 adapted to be moved back and forth in a direction parallel with the spindle axis by actuation of a hand wheel 13, the shaft 14 of which is connected with the table through a crank 15 and a link 16. On top of the table is a turret 17 which mounts a work holding assembly, indicated generally by the numeral 18. The work holding assembly comprises a housing 19 and a collet chuck 20 journalled therein. The jaws 21 of this chuck are opened and closed by manipulation of a chuck controlling lever 22.

In the present instance the work 23 being performed is in the nature of a collar or washer having a tapered bore 24 and a straight bore 25. The work piece is thus gripped with its tapered bore facing out toward the grinder wheel so that upon movement of the reciprocating table 12 it is brought into and out of cooperative engagement with the grinder. Adjustment of the grinder spindle bracket by the hand wheel 7 determines the depth of the grinding.

During the grinding operation the work is revolved by a motor 26 mounted on and above the housing 19. Gears (not shown) within a gear box 27 and a belt and pulley transmission 28 transmits the motor drive to the chuck.

Figures 4, 5:
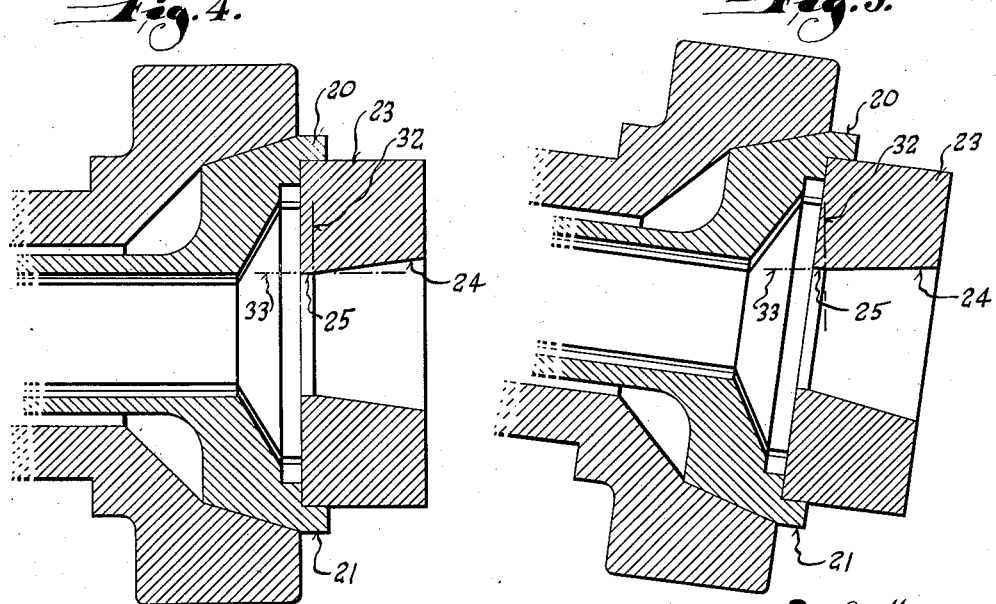
Figures 4 and 5 are enlarged detail sectional views through the work holder illustrating a piece of work therein and diagrammatically illustrating the manner in which angular adjustment of the turret swings the work about its point centered over the turret axis.

The turret is rotatably mounted on the reciprocating table by means of a spindle post 29 fixed to and projecting up from the table and having a bearing 30 thereon. The outer race of this bearing is secured in the underside of the turret and has anti-friction blocks 31 riding on the table top.

Where the axis about which the turret swings passes through the work determines the point about which the angle of the grind changes. This is diagrammatically illustrated in Figures 4 and 5 where the crossed center lines 32 and 33 intersect at the juncture of the tapered and straight bores 24 and 25. In Figure 4 the parts are shown with the work held in position for straight bore grinding, while in Figure 5 they are adjusted to the position at which the tapered bore is ground.

Different work, of course, calls for different locations of the point about which the angle of the grind changes, and inasmuch as this point must always lie on the turret axis, it follows that the work holding assembly must be adjustable on the turret, and to this end the cap screws 34 by which the housing is clamped to the turret pass through holes considerably larger than the screws to permit the housing to be shifted as required.

To facilitate such shifting and to enable accurate disposition of the housing 19 on the turret a slide plate 35 is interpositioned between the turret and the bottom of the housing. This slide plate, as best shown in Figure 7, has a tongue and groove connection 36 with the housing 19 and a similar tongue and groove connection 37 with the turret, but disposed at right angles to the first named tongue and groove connection.

Additionally, the turret has two fixed stops 38 and 39 mounted thereon and arranged at right angles to each other. These fixed stops are opposite right-angularly disposed gaging surfaces 38' and 39' on the chuck housing 19. Hence, with the cap screws 34 loosened and with gage blocks (not shown) of the proper size interposed between the stops 38 and 39 and their cooperating gaging surfaces 38' and 39' it is possible to quickly and accurately adjust the housing to its proper location on the turret predetermined by layout.

With this adjustment effected, the cap screws 34 are tightened down and thereafter the machine is set up for production runs of the particular work for which the adjustment was made.

Figure 2:
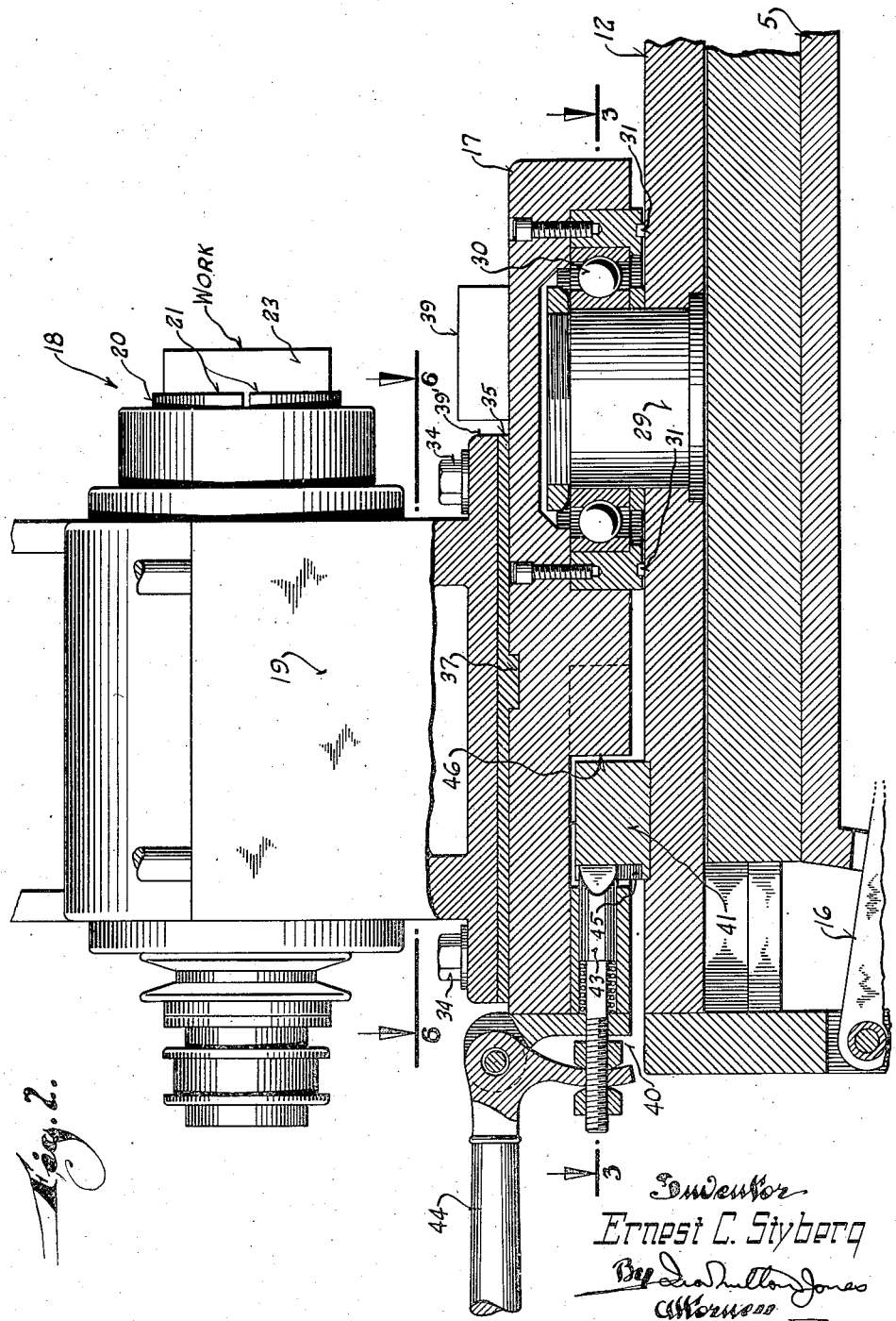
Figure 2 is a view partially in side elevation and partially broken away and in section illustrating particularly the work holding assembly and the turret upon which it is mounted.
Figure 3:
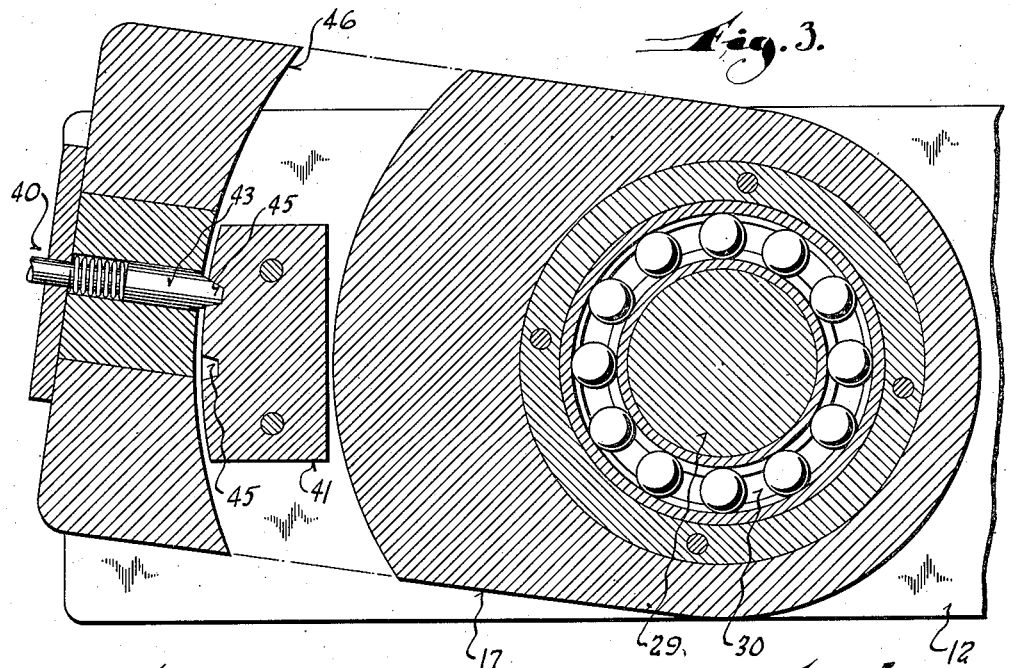
Figure 3 is a horizontal cross sectional view taken through Figure 2 on the plane of the line 3—3.

In such an instance where all the work to be done has a tapered surface and a straight surface at one angle to each other, a spring detent 40 and a keeper block 41 are employed to quickly locate and lock the turret in one or the other of its two positions. The spring detent is mounted on the underside of the turret and, as shown in Figure 2, comprises a spring pressed plunger 43 retractible by manipulation of a handle 44 and spring projected into one or the other of two recesses or notches 45 in the keeper block 41. The keeper block 41 is removably fixed to the table 12 and rides in an arcuate channel 46 in the underside of the turret.

Obviously, when the work calls for a different angle of turret adjustment, the keeper block 41 is replaced with another block having its notches set at the proper angular spacing. Hence, by actuation of the lever 44 which withdraws the detent plunger the turret may be quickly indexed from one position of adjustment to the other, and when in such position the spring detent snaps into place and locks the work holding assembly in the desired position.

For individual, non-production jobs an indicator 47, illustrated in Figures 8, 9 and 10, is provided. This indicator is clamped to the side of the table by means of a screw 48 and has a tongue 49 entering a groove 50 in the table to accurately position the indicator so that its pointer 51 is held in proper position for coaction with a scale on the turret.

In addition to affording an indication of the angular position of the turret, the indicator also serves to lock the turret in adjusted position; and to this end has a tongue 52 with a tapered undersurface engaging in a groove 53 in the side of the turret. Hence, by tightening the screw 48 the tongue 52 is forced down into the groove to lock the turret in position.

To prevent binding in production, when indexing between notches 45 in the keeper block 41, adjustable feet 54 are screwed into the indicator block to bear against the side of the table and limit the extent to which it may be drawn down by the screw 48.

The reciprocating means, shown in Figure 1, comprising a crank and link imparts rapid motion to the table, but the length of the motion in either direction is limited to the throw of the crank. When longer table motion is desired, the table reciprocating means shown in Figure 11 may be substituted for the crank and link. In this instance the handwheel shaft mounts a sprocket 55 which has the medial portion of a chain 56 meshed therewith. The ends of the chain are trained over idler wheels 57 and 58 and are secured to a post 59 which is fixed to the reciprocating table 12; a tensioning mechanism 60 being provided to take up the slack in the chain.

In effect, therefore, the chain is endless and inasmuch as the idler wheels are mounted at spaced points along the path of table reciprocation that stretch of the chain attached to the table is substantially parallel with its path to insure a direct pull on the table.

From the foregoing description, taken in connection with the accompanying drawings, it will be readily apparent to those skilled in the art, that this invention provides a grinder especially well adapted for combined taper bore and straight bore grinding, and that by virtue of the novel manner in which the adjustment is effected to alter the angle of the grind the machine lends itself well to production methods of manufacture and assures perfect concentricity between the bores due to the fact that the grinding of the bore is accomplished with one chucking of the work.

What I claim as my invention is:

1. In a metal working machine tool of the character described: a work holding assembly; a tool holding assembly; a cutting tool on said assembly; means for moving the assemblies toward and from each other to bring work on the work holding assembly into cooperative relationship with the cutting tool; a turret carrying one of the assemblies, angular indexing of which varies the angular relationship between the tool and work; means adjustably mounting the turret carried assembly on the turret so that the point about which the angle of the work performed is to change may be centered on the axis of the turret regardless of variations in size of the work within the capacity of the machine; right angularly disposed gaging surfaces on the turret carried assembly; and fixed stops mounted on the turret opposite said gaging surfaces to cooperate therewith through use of appropriately sized gage blocks inserted between the gaging surfaces and the stops in providing means for accurately locating the assembly on the turret.

2. In a grinder of the character described: a grinder wheel revolving on a fixed axis; a reciprocal table movable in a direction parallel with said fixed axis; a turret on the table; a work holding chuck adjustably mounted on the turret; means for revolving the work holding chuck; means for reciprocating the table to bring the work into engagement with the revolving grinder wheel; means for swinging the turret on its axis during the grinding operation to change the angle of the ground surfaces about a point centered over the turret axis; an indicator mounted on the reciprocating table for facilitating angular adjustment of the turret; and clamping means on the indicator engaging with the turret for locking the turret in an adjusted position.

3. In a machine of the character described: a work holding assembly and a tool holding assembly; a turret on which one of the assemblies is mounted; a supporting body for said assembly; means adjustably securing the supporting body to the turret including a slide plate interposed between the supporting body and the turret, an interengaging tongue and groove connection between the slide plate and the supporting body, another interengaging tongue and groove connection between the slide plate and the turret and disposed at right angles to the first named tongue and groove connection, and fastening means for securing the supporting body to the turret in different positions of adjustment, the supporting body having gaging surfaces adjacent to the turret and disposed at right angles to each other; and fixed stops on the turret opposite said gaging surfaces between which and said gaging surfaces gage blocks may be inserted to enable location of the supporting body on the turret in a predetermined position to center a predetermined portion of the turret carried assembly over the turret axis.

4. In a machine of the character described: a work holding assembly and a tool holding assembly; a turret on which one of the assemblies is mounted; a supporting body for said assembly; means adjustably securing the supporting body to the turret including a slide plate interposed between the supporting body and the turret, an interengaging tongue and groove connection between the slide plate and the supporting body, another interengaging tongue and groove connection between the slide plate and the turret and disposed at right angles to the first named tongue and groove connection; fastening means for securing the supporting body to the turret in different positions of adjustment; and means for facilitating location of the supporting body on the turret in a predetermined positoin to center a predetermined portion of the turret carried assembly over the turret axis.

5. A machine for finishing angularly disposed concentric surfaces with one chucking of the work, comprising: a base; a tool carrying head transversely adjustable on the base; a tool in said head; a table longitudinally reciprocable on the base; a turret mounted on the table to turn about an axis fixed with respect to the table; a work holding assembly adjustably mounted on the turret and including a chuck to grasp the work piece, said adjustable mounting of the work holding assembly enabling disposition of that part of the work at which the angle of the finished surfaces is to change, directly over the axis of the turret, so that indexing of the turret from one to the other of two predetermined positions accurately establishes the angle of the finished surfaces while the work piece is held in the chuck; fixed stops on the table under the turret; said fixed stops being spaced apart on an arc struck from the axis of the turret a distance determined by the desired angle between the finished surfaces; a releasable detent carried by the turret and cooperable with the fixed stops to lock the turret in one position or the other; means for releasing the detent to enable quick indexing of the turret from one position to the other; and means for reciprocating the table to bring the work into cooperative relation with the tool.

ERNEST C. STYBERG.